United States Patent
Roither et al.

(10) Patent No.: US 11,383,323 B2
(45) Date of Patent: Jul. 12, 2022

(54) BEAM-FORMING AND DEFLECTING OPTICAL SYSTEM FOR A LASER MACHINING DEVICE, AND METHOD FOR MACHINING A WORKPIECE USING A LASER BEAM

(71) Applicant: Fronius International GmbH, Pettenbach (AT)

(72) Inventors: Stefan Roither, Pettenbach (AT); Manuel Binder, Pettenbach (AT); Stefan Pichler, Pettenbach (AT)

(73) Assignee: Fronius International GmbH, Pettenbach (AT)

(*) Notice: Subject to any disclaimer, the term of this patent is extended or adjusted under 35 U.S.C. 154(b) by 0 days.

(21) Appl. No.: 17/438,017

(22) PCT Filed: Mar. 10, 2020

(86) PCT No.: PCT/EP2020/056284
§ 371 (c)(1),
(2) Date: Sep. 10, 2021

(87) PCT Pub. No.: WO2020/182780
PCT Pub. Date: Sep. 17, 2020

(65) Prior Publication Data
US 2022/0088705 A1    Mar. 24, 2022

(30) Foreign Application Priority Data
Mar. 11, 2019  (EP) .................... 19162003.8

(51) Int. Cl.
*B23K 26/06* (2014.01)
*G02B 27/09* (2006.01)
*B23K 26/073* (2006.01)

(52) U.S. Cl.
CPC ...... *B23K 26/0734* (2013.01); *B23K 26/0648* (2013.01); *B23K 26/0652* (2013.01); *G02B 27/0927* (2013.01)

(58) Field of Classification Search
CPC ........... B23K 26/0652; B23K 26/0648; B23K 26/0643; B23K 26/067; B23K 26/0676;
(Continued)

(56) References Cited

U.S. PATENT DOCUMENTS 3,378,687 A * 4/1968 Schepler ................ G01S 3/786
                                                        250/236
3,720,454 A    3/1973 Inderhees
(Continued)

FOREIGN PATENT DOCUMENTS

CN       2598002 Y    1/2004
CN    101670486 A    3/2010
(Continued)

OTHER PUBLICATIONS

European Search Report dated Oct. 8, 2019 in European Application No. 19162003.8 with English translation of the relevant parts.
(Continued)

*Primary Examiner* — Ibrahime A Abraham
*Assistant Examiner* — Chris Q Liu
(74) *Attorney, Agent, or Firm* — Collard & Roe, P.C.

(57) ABSTRACT

A beam-forming and deflecting optical system for a laser machining device includes at least two optical elements, which are arranged one behind the other in the direction of the laser beam and which are formed by wedges with respective wedge angles, wherein at least one optical element is connected to a drive for the rotation of the optical element about the optical axis, whereby an optical wedge can be rotated relative to the at least one other optical wedge. Also a method for machining a workpiece uses a collimated
(Continued)

laser beam. In order to achieve different shapes of the laser beam on the workpiece, each of the optical wedges, which are arranged one behind the other, in each case cover only a part of the laser beam.

15 Claims, 7 Drawing Sheets

(58) Field of Classification Search
CPC .. B23K 26/08; B23K 26/082; B32K 26/0652; G02B 5/04
USPC ............... 219/121.67, 121.73, 121.79, 121.8
See application file for complete search history.

(56) References Cited

U.S. PATENT DOCUMENTS

| | | | |
|---|---|---|---|
| 4,822,974 A * | 4/1989 | Leighton | B23K 26/082 359/201.1 |
| 5,227,910 A * | 7/1993 | Khattak | G02B 26/108 359/209.1 |
| 5,526,167 A | 6/1996 | Peng | |
| 6,193,710 B1 * | 2/2001 | Lemberg | A61F 9/008 606/17 |
| 6,225,595 B1 * | 5/2001 | Wei | B23K 26/06 219/121.75 |
| 6,905,068 B2 * | 6/2005 | He | G06K 7/10811 235/462.35 |
| 8,345,718 B2 | 1/2013 | Heyne et al. | |
| 8,982,210 B2 * | 3/2015 | Fry | F41G 7/008 348/148 |
| 9,075,239 B2 * | 7/2015 | Kim | G02B 27/0955 |
| 9,285,593 B1 | 3/2016 | Laskin et al. | |
| 9,931,712 B2 * | 4/2018 | Wang | B23K 26/0643 |
| 10,444,521 B2 | 10/2019 | Rudolf et al. | |
| 2007/0086493 A1 * | 4/2007 | Apolonski | H01S 3/1112 372/18 |
| 2009/0045176 A1 * | 2/2009 | Wawers | B23K 26/389 219/121.78 |
| 2014/0353296 A1 * | 12/2014 | Fukuhara | B23K 26/382 219/121.67 |
| 2016/0067820 A1 * | 3/2016 | Mironets | B23K 26/0652 219/76.12 |
| 2018/0071848 A1 | 3/2018 | Walter | |

FOREIGN PATENT DOCUMENTS

| | | |
|---|---|---|
| CN | 107405711 A | 11/2017 |
| CN | 108508595 A | 9/2018 |
| DE | 10 2008 022 724 A1 | 11/2009 |
| DE | 102017205889 A1 | 10/2018 |
| EP | 2 780 131 B1 | 2/2016 |
| EP | 3 250 958 B1 | 12/2018 |
| JP | 2007-289980 A | 11/2007 |

OTHER PUBLICATIONS

International Search Report of PCT/EP2020/056284, dated Jul. 2, 2020.

* cited by examiner

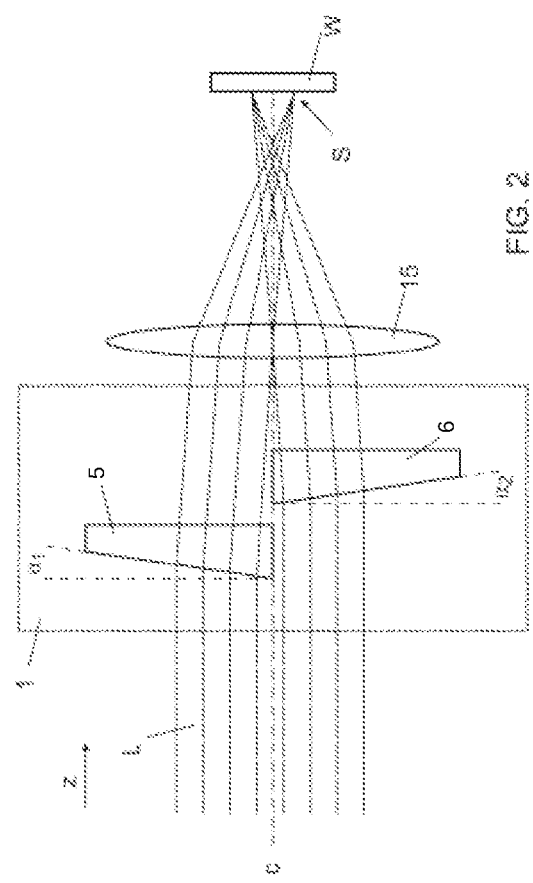
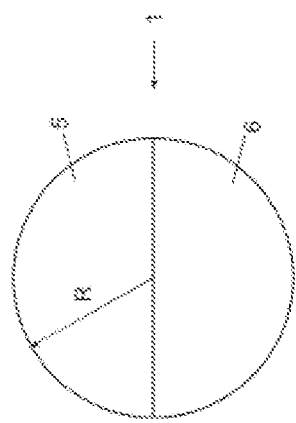

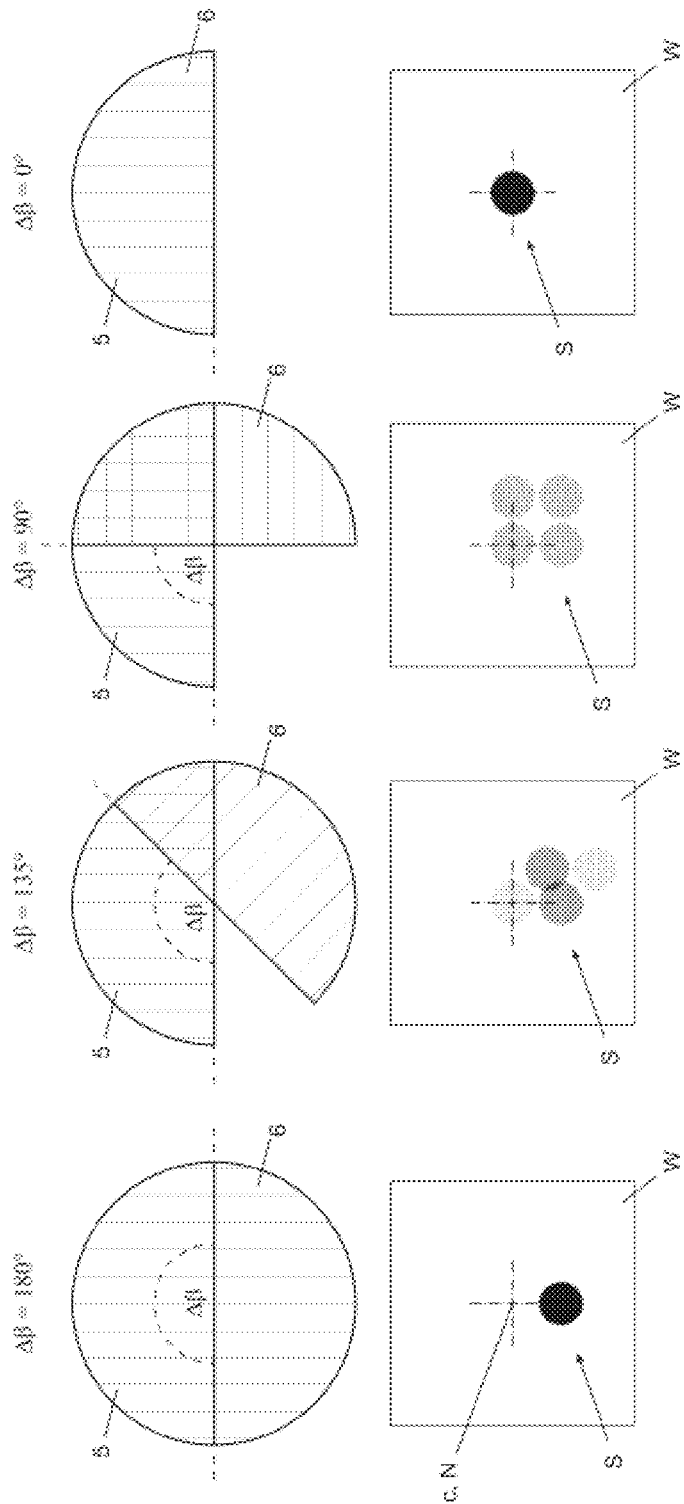

BEAM-FORMING AND DEFLECTING OPTICAL SYSTEM FOR A LASER MACHINING DEVICE, AND METHOD FOR MACHINING A WORKPIECE USING A LASER BEAM

CROSS REFERENCE TO RELATED APPLICATIONS

This application is the National Stage of PCT/EP2020/056284 filed on Mar. 10, 2020, which claims priority under 35 U.S.C. § 119 of European Application No. 19162003.8 filed on Mar. 11, 2019, the disclosure of which is incorporated by reference. The international application under PCT article 21(2) was not published in English.

The invention relates to a beam-forming and deflecting optical system for a laser machining device, comprising at least two optical elements, which are arranged one behind the other in the direction of a collimated laser beam and which are formed by wedges with a respective wedge angle, wherein at least one optical element is connected to a drive for the rotation of the optical element about the optical axis, whereby an optical wedge can be rotated relative to the at least one other optical wedge.

The invention further relates to a method for machining a workpiece using a collimated laser beam, wherein the collimated laser beam runs through a beam-forming and deflecting optical system comprising at least two optical elements, which are arranged one behind the other in the beam direction of the laser beam, in the form of at least two optical wedges with a respective wedge angle, and a focusing lens, wherein at least one optical wedge is rotated about the optical axis relative to the at least one other optical wedge of the beam-forming and deflecting optical system.

The invention refers to methods and devices for machining a workpiece (in particular laser welding or laser spot welding and soldering) using a laser beam, as well as to methods and devices for machining a workpiece by means of one or several laser beams, combined with an electric arc, as it is used, for example, in the case of laser-hybrid welding methods.

Using a laser beam, workpieces can be, for example, welded, cut, elements can be connected to a workpiece by means of soldering, or the surface of workpieces can be machined by means of the heat introduced by means of the laser. Depending on the application and condition of the workpiece, different diameters and shapes of the spot of the laser beam, which impinges on the workpiece surface, are required. The formation of the laser beam usually takes place by means of corresponding optical elements, which are arranged downstream from the laser generating device and possible collimating lens, in order to influence the laser beam. Different spot shapes of the laser beam, which are suitable for various tasks, can be generated on the surface of the workpiece to be machined via a beam-forming and deflecting optical system of this type.

It may also be required that the distribution of the power density of the laser beam is to be changed during an ongoing machining of the workpiece, for the purpose of which corresponding optical means comprising movably arranged optical elements are used.

For example, EP 2 780 131 B1 describes a method for laser welding, wherein optical elements are rotated to improve the welding process, and the laser beam is thus deflected accordingly.

EP 3 250 958 B1 describes a device and a method for machining a workpiece using a laser beam, wherein, for forming and deflecting the laser beam, at least one plate-shaped optical element is arranged, the one surface of which is provided with a circular pattern with sector-shaped facets with different inclinations, whereby the laser focus in the focal plane is broken down into a plurality of spots, which are arranged around the optical axis of the beam path in a ring-shaped manner.

U.S. Pat. No. 9,285,593 B1 describes a method for forming a laser beam for attaining round or square spot shapes with specific intensity distributions. For this purpose, a full-surface optical element with a relatively sophisticated surface contour is inserted into the beam path of the laser beam.

An optical device for scan systems has become known from U.S. Pat. No. 5,526,167 A and from U.S. Pat. No. 3,720,454 A, by means of which a laser beam can be deflected or the focus can be varied, respectively. Apart from the different technical field, no change of the spot shape and of the power density of the laser beam can be attained.

A disadvantage of the known methods and devices of the type at hand is the lack of flexibility of the change of the spot shape during the machining of the workpiece and/or the complex and elaborate construction of the beam-forming and deflecting optical system, which does not provide for a compact design of the laser machining device.

The object of the present invention thus lies in creating an above-mentioned beam-forming and deflecting optical system of a laser machining device as well as an above-mentioned method for machining a workpiece using a laser beam, by means of which a simple and adaptive beam shape can be attained for various applications. The change of the beam shape is to also be capable of being carried out as quickly as possible during the laser machining process. The beam-forming and deflecting optical system is to further be constructed in a manner, which is as space-saving as possible, so that the beam formation with small interference contour is made possible. Disadvantages of known devices and methods are to be prevented or at least reduced.

The object according to the invention is solved by means of an above-mentioned beam-forming and deflecting optical system of a laser machining device, in the case of the optical wedges, which are arranged one behind the other, in each case cover only a part of the laser beam. The present invention provides for a particularly simple construction by means of at least two optical wedges, which can be rotated to one another. The optical wedges or optical prisms, respectively, are constructed from suitable materials, in particular glass, and can also be formed by means of so-called diffractive beam formers or diffractive optical elements (DEO). Diffractive optical elements are structures made of glass or plastic, which change the phase distribution of the laser beam. A division of the laser beam into several spots and a change of the spot shape at the workpiece surface can be attained thereby in a particularly simple and quick manner. Due to the simple construction, a particularly space-saving realization is possible, which has a small interference contour and provides for a slim construction of the machining head. A change of the beam formation and beam deflection can also be performed during the machining process by rotation of the at least two optical wedges to one another and/or joint rotation of all of the optical wedges, and an optimal adaptation of the laser beam to the desired machining can be carried out. For example, a change of the spot shape for changing the gap bridgeability can be performed during a welding process without interruption of the process.

When the wedge angles of all optical wedges are quantitatively equal, the beam-forming and deflecting optical system can be positioned in a neutral position, if necessary. In the case of a corresponding position of the optical wedges to one another in this neutral position, a cancellation of the deflection of the laser beam can be attained and the laser beam thus impinges on the workpiece in an unchanged manner.

The optical wedges in each case advantageously cover between 25% and 50% of the laser beam. Such coverage values are suitable, depending on the number of optical wedges and desired number of spots on the surface of the workpiece to be machined.

The optical wedges are preferably formed in the shape of a sector of a circle or in the shape of a segment of a circle. By means of a formation of the optical wedges in the shape of a sector of a circle or in the shape of a segment of a circle in the top view thereof, a particularly space-saving arrangement of the beam-forming and deflecting optical system is attained, because the outer contour is not changed in response to rotation of the optical wedges to one another or joint rotation of all optical wedges. A space-saving design with small interference contour thus results.

When the optical wedges are in each case arranged in a hollow shaft, a relatively simple rotation of the optical wedges can be attained by means of rotation of the respective hollow shafts. The optical wedges can also be protected against contamination within the hollow shaft. To attain a quiet running at high rotational speeds, the hollow shafts can be balanced.

The hollow shafts preferably have a diameter of between 25 mm and 90 mm. A particularly space-saving and slim design of the beam-forming and deflecting optical system and thus of the entire laser machining device or of the machining head, respectively, can thus be attained, which allows for an improved mobility thereof. In particular in the case of robot applications, this is of great significance. To protect the hollow shafts and adjoining components of the beam-forming and deflecting optical system against thermal overheating, for example due to absorption of scattered laser radiation and/or retroreflected process radiation, respectively, the inner surfaces of the hollow shafts can optionally be provided with a reflective coating, in particular a gold coating.

The wedge angle of the optical wedges is at least 1 millirad (0.057°), preferably between 3 millirads (0.17°) and 15 millirads (0.859°). According to experience, wedge angles of this type are expedient for attaining corresponding spot sizes and spot shapes on the surface of the workpiece to be machined.

According to a further feature of the invention, at least one actual value sensor is provided for the determination of the position of the optical wedges or hollow shafts, respectively. By means of rotation sensors or rotation angle sensors of this type, respectively, an optimal detection and control of the position of the optical wedges to one another or of all optical wedges, respectively, with respect to the workpiece can take place. Actual value sensors are available in various embodiments and in a small overall size, whereby the dimensions of the beam-forming and deflecting optical system are not significantly enlarged. For example, the actual value sensor can be formed by an encoder (optical, inductive) or resolver.

The optical wedges can be made of quartz glass, borosilicate-crown glass, zinc selenide, or zinc sulfide. These materials are particularly suitable for the deflection and forming of laser beams and are furthermore also relatively temperature-resistant.

All optical wedges or the hollow shafts, respectively, can be connected to a respective drive for the independent rotation of each optical wedge about the optical axis. A high flexibility is thus achieved in attaining various beam forms.

A drive for the joint rotation of all optical wedges or hollow shafts, respectively, can further be provided. In addition to the formation of different spot shapes, a better coverage of the surface of the workpiece to be machined can be attained by means of the rotation of the entire arrangement about the optical axis, in that the spots rotate about the zero point or the optical axis, respectively. A so-called dynamic beam formation is thus generated.

The at least one drive is connected to a motor control, so that the desired beam shapes can be adjusted quickly and easily. As a function of the used drive motors, the motor control can be formed, for example, by means of a microcontroller or microprocessor.

The object according to the invention is also solved by means of an above-mentioned method for machining a workpiece using a collimated laser beam, wherein the laser beam is only partly covered by the optical wedges, which are arranged one behind the other. The method according to the invention provides for a quick and adaptive beam formation in simple design. With regard to the further advantages, reference is made to the above description of the beam-forming and deflecting optical system.

When the laser beam runs through at least two optical wedges with quantitatively equal wedge angle, a cancellation of the beam formation and deflection can take place in the case of a corresponding position of the optical wedges, whereby the laser beam impinges on the surface of the workpiece to be machined in an unchanged manner.

The optical wedges are rotated at a rotational speed of between 100 and 10000 U/min, preferably between 500 and 7000 U/min. Speed values of this type provide for a quick change of the spot shapes to be attained, which are sufficient for most of the machining processes.

The position and rotation of the at least two optical wedges can be detected using at least one actual value sensor. As already mentioned above, an optimal control of the beam-forming and deflecting optical system can be attained by means of the detection of the position and rotation of all of the optical wedges using corresponding rotary encoders.

When the at least two optical wedges are rotated at the same speed in the same direction, a rotation of the spot shape, which is formed by means of the assignment of the at least two optical wedges to one another, about the zero point or the optical axis, respectively, can be attained. This corresponds to a dynamic beam formation, by means of which the region covered by the laser beam on the surface of the workpiece to be machined can be enlarged.

When the at least two optical wedges are rotated at the same speed in opposite direction, a periodic change of the spot shape during the machining of the workpiece is attained. The pendulum effect resulting thereby, at which the power density of the laser beam is moved back and forth in the workpiece plane, can be advantageous for certain applications.

At least one optical wedge can further be rotated back and forth about a specified angular range in a pendulum movement. Each spot shape can thus be pivoted back and forth about the specified angular range, whereby a larger coverage of the region to be machined can be attained on the workpiece. The specified angular range can lie, for example, between 45° and −45°.

According to a further feature of the invention, the laser beam can also be formed as a function of the position and movement of the machining head of the laser machining device with respect to the workpiece to be machined, in order to be able to attain an optimal machining result for each position and movement. For example, a different spot shape of the laser beam can be useful in response to a vertical machining, horizontal machining, or overhead machining of the workpiece. The beam formation can further also be designed as a function of the speed of the machining head. The position and movement of the machining head can be detected by means of corresponding sensors or can also be derived from movement data of a possible robot in the case of automated laser machining devices, and can be supplied to the beam-forming and deflecting optical system or the motor control(s) thereof, respectively, for the optical wedges.

In the case of the mentioned laser-hybrid welding apparatuses with a combination of at least one laser beam with at least one electric arc, the change of the spot shape of the at least one laser beam can provide advantages for some applications as a function of welding parameters (welding current, welding voltage, feed speed of a welding wire, polarity of the welding current, etc.) or of phases of the welding process (short-circuit phase, pulse phase, electric arc phases, etc.).

In the case of laser-hybrid apparatuses, the position of the laser beam with respect to the electric arc can also be crucial for the formation of the laser beam. For example, a spot shape of the laser beam other than in the case of a laser beam downstream from the electric arc, can be advantageous for an upstream laser beam relative to the electric arc.

The present invention is described in more detail on the basis of the enclosed drawings, in which:

FIG. 2 shows an embodiment alternative of a beam-forming and deflecting optical system according to the invention in cut side view;

FIG. 3 shows a top view onto the beam-forming and deflecting optical system according to FIG. 2;

FIG. 4A to 4D show various positions of two semi-circular optical wedges of a beam-forming and deflecting optical system with respect to one another for attaining various shapes of laser beams on the workpiece;

Figure 1:
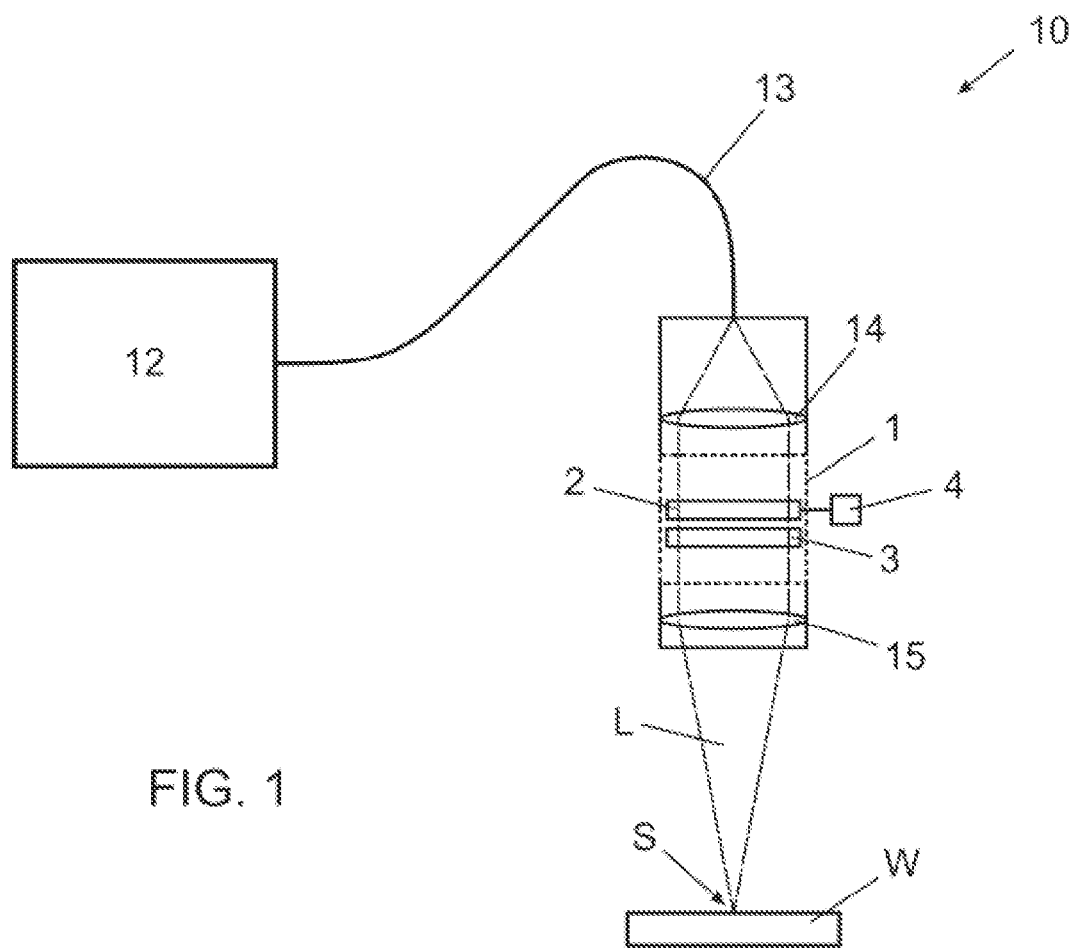
FIG. 1 shows a block diagram of a device for machining a workpiece using a laser beam according to the prior art.

FIG. 1 shows a block diagram of a device 10 for machining a workpiece W using a laser beam L according to the prior art. The machining device 10 includes a laser generating device 12 and an optical fiber 13, via which the laser beam L is transported to the corresponding machining head. The laser beam L is collimated, for example, using a collimating lens 14 and is focused on the surface of the workpiece W to be machined via a focusing lens 15. The laser beam L can be influenced via a beam-forming and deflecting optical system 1 arranged between the collimating lens 14 and the focusing lens 15 in such a way that the spot shape S on the surface of the workpiece W to be machined can be changed. For this purpose, at least two optical elements 2, 3 are arranged one behind the other in the beam path of the laser beam L in the beam-forming and deflecting optical system 1, which optical elements 2, 3 influence the collimated laser beam L accordingly, so that the spot shape S on the surface of the workpiece W to be machined changes. By means of a change of the orientation of an optical element 2 with respect to the other optical element 3, a change of the spot shape S of the laser beam L can also take place during the machining of the workpiece W. For this purpose, an optical element 2 is connected to a corresponding drive 4. In the case of a laser-hybrid welding apparatus, the laser beam L is combined with at least one electric arc (not illustrated).

FIG. 2 shows an embodiment alternative of a beam-forming and deflecting optical system 1 according to the invention in cut side view. The at least two optical elements 2, 3 of the beam-forming and deflecting optical system 1 are formed by means of optical wedges 5, 6 with a respective wedge angle $\alpha_1$, $\alpha_2$. Optical wedges 5, 6 or prisms of this type, respectively, deflect the collimated laser beam L according to the wedge angle $\alpha_1$, $\alpha_2$, whereby the point of impingement of the laser beam L on the surface of the workpiece W to be machined and thus the spot shape S changes. Due to the fact that the two optical wedges 5, 6 in each case only cover a part of the laser beam L, the number of the points of impingement of the laser beam on the surface of the workpiece W can be changed. In the illustrated exemplary embodiment, the two optical wedges 5, 6 in each case cover essentially 50% of the laser beam L. Downstream from the beam-forming and deflecting optical system 1, viewed in the direction z of the laser beam L, a focusing lens 15 is arranged, via which the deflected laser beam L is focused accordingly on the surface of the workpiece W to be machined. By means of rotation of at least one optical wedge 5, 6 about the optical axis c, a change of the spot shape S on the surface of the workpiece W can be attained. By means of a rotation of the entire beam-forming and deflecting optical system 1 about the optical axis c, a dynamic beam formation or rotation, respectively, of the spot shape S about the optical axis c can be attained. The second optical wedge 6 with the wedge angle $\alpha_2$ can also be arranged in a mirror-inverted manner to the optical wedge 6 according to FIG. 2, whereby other beam and spot shapes S can be generated. When, for example, the wedge angles $\alpha_1$, $\alpha_2$ of the optical wedges 5, 6 are quantitatively equal, a cancellation of the deflection of the collimated laser beam L can take place by means of the optical wedges 5, 6 in the case of a corresponding opposite orientation of the two optical wedges 5, 6 to one another, whereby the collimated laser beam L is not influenced significantly by means of the beam-forming and deflecting optical system 1, and a spot shape S results on the surface of the workpiece W, which corresponds to a spot shape S without beam-forming and deflecting optical system 1. This means that in the case of a corresponding oppositely oriented positioning of the optical wedges 5, 6 with quantitatively equal wedge angles $\alpha_1=\alpha_2$, the beam formation and deflection of the laser beam L can be switched into a neutral position.

FIG. 3 shows a top view onto the beam-forming and deflecting optical system 1 according to FIG. 2. In the top view, the optical wedges 5, 6 are preferably formed in the shape of a sector of a circle or in the shape of a segment of a circle, and have a radius R in the range of 10 mm to 40 mm, whereby the size of the beam-forming and deflecting optical system 1 can be kept small, and the overall size of the machining head of the laser machining device 10 can be reduced.

Various positions of two semi-circular optical wedges 5, 6 of a beam-forming and deflecting optical system 1 with respect to one another for attaining various shapes of laser beams L on the workpiece W are illustrated in FIG. 4A to 4D. In the illustrated exemplary embodiment, the two optical wedges 5, 6 have opposite and equal angles $\alpha_1 = -\alpha_2$. In the case of a position of the two optical wedges 5, 6 to one another with an angle $\Delta\beta = 180°$ according to FIG. 4A, the laser beam L is deflected by the optical wedge 5 and optical wedge 6 in the same direction, whereby a spot shape S results at the workpiece W, which is deflected accordingly from the zero point N or center, respectively, of the optical axis c. In the case of the position of the optical wedges 5, 6 to one another with an angle $\Delta\beta = 135°$ between two optical wedges 5, 6 illustrated in FIG. 4B, a spot shape S results on the surface of the workpiece W, which has four points of impingement of the laser beam L at various points around the optical axis c according to the wedge angles $\alpha_1$ and $\alpha_2$ of the optical wedges 5, 6, the deflecting effects of which add up accordingly in the overlap region. In the case of the arrangement according to FIG. 4C with an angle $\Delta\beta = 90°$ between the optical wedges 5, 6, the spot shape S, which is illustrated accordingly, results on the workpiece W. In the case of the position of the optical wedges 5, 6 to one another according to FIG. 4D (angle $\Delta\beta = 0°$), the effects of the optical wedges 5, 6 with wedge angle $\alpha_1 = -\alpha_2$ compensate, whereby a spot shape S results on the workpiece W, which is arranged in the center of the optical axis c or the zero point N, respectively, and which corresponds to a spot shape S of the laser beam L without beam-forming and deflecting optical system 1.

By changing the orientation of the two optical wedges 5, 6 to one another or by means of the change of the angle $\Delta\beta$ between the optical wedges 5, 6, respectively, a change of the spot shape S can thus be attained on the surface of the workpiece W. By increasing the number of the optical wedges, for example to three or more optical wedges, the number of the spots in the spot shape S can be increased, and the variation of the attainable spot shapes S can be changed even further.

Figure 5:
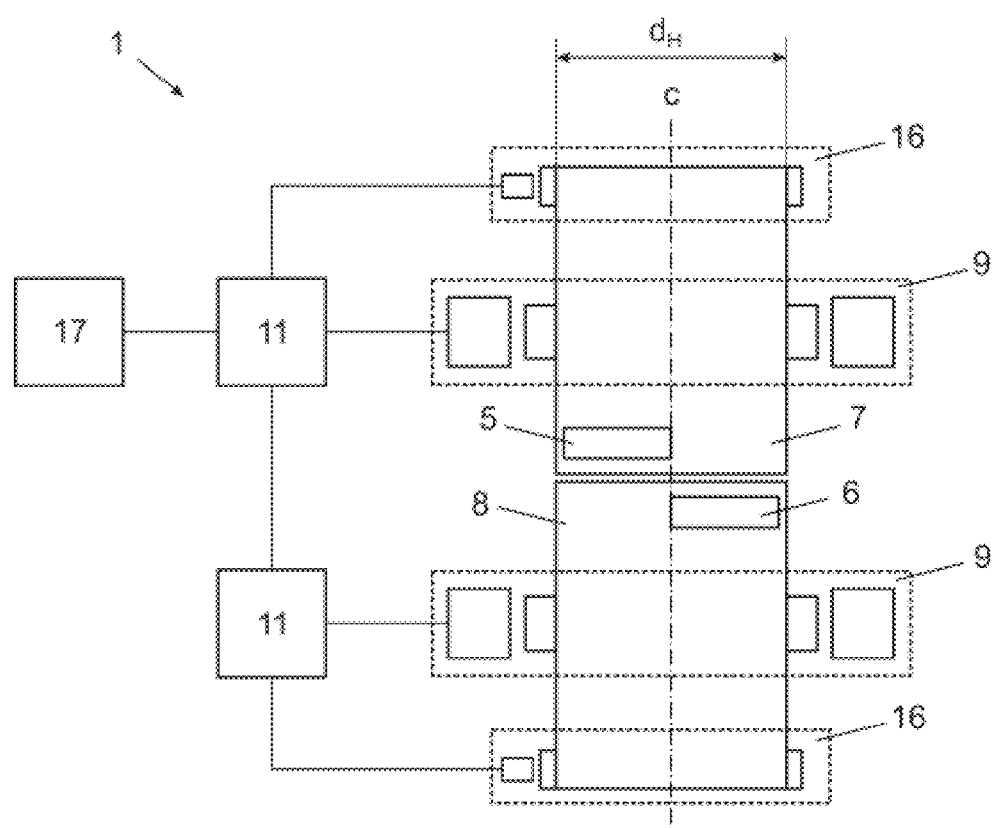
FIG. 5 shows an embodiment of a beam-forming and deflecting optical system comprising drives for the movement of the optical wedges in partially cut form.

FIG. 5 shows an embodiment of a beam-forming and deflecting optical system 1 comprising drives for the movement of the optical wedges 5, 6 in partially cut form. The optical wedges 5, 6 of the beam-forming and deflecting optical system 1 are in each case arranged in hollow shafts 7, 8, which can be rotated about the optical axis c via corresponding drives 9. The drives 9 can be formed, for example, by means of hollow shaft motors or torque motors. In addition to the drives 9 for the rotation of the optical wedges 5, 6 or hollow shafts 7, 8, a further drive 9 for the rotation of the entire beam-forming and deflecting optical system 1 about the optical axis c can be provided (not illustrated). Via corresponding actual value sensors 16, the positions of the optical wedges 5, 6 or hollow shafts 7, 8, respectively, can be detected. Corresponding motor controls 11 control the corresponding drives 9 according to the settings of an operating unit 17 or on the basis of other specifications, such as, for example, on the basis of the position and movement of the machining head of the laser machining device 10 with respect to the workpiece W or on the basis of parameters in the case of laser-hybrid applications, such as, for example, on the basis of welding parameters (welding current, welding voltage, feed speed of a welding wire, polarity of the welding current, process phases, etc.). The beam-forming and deflecting optical system 1 of the type at hand is characterized by a relatively small overall size and compact embodiment. For example, diameters $d_H$ of the hollow shafts 7, 8 in the range of between 25 mm and 90 mm are attained, whereby a small interference contour results. Cooling ducts for guiding a cooling fluid (not illustrated) can optionally be arranged in the housing of the beam-forming and deflecting optical system 1.

Figure 6:
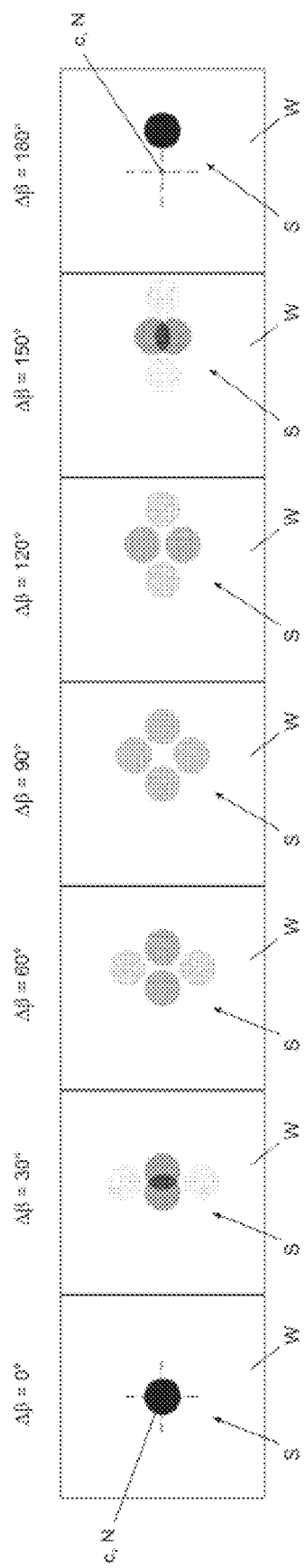
FIG. 6 shows various beam shapes at various angular positions between two optical wedges to one another (static spots)

Various spot shapes S are reproduced in FIG. 6 at various angles $\Delta\beta$ between the optical wedges 5, 6 to one another. Using the example of two optical wedges 5, 6 with opposite and equal wedge angles $\alpha_1 = -\alpha_2$, various spot shapes S are illustrated here, wherein the angular position $\Delta\beta$ of the two optical wedges 5, 6 to one another is varied in 30° steps. The resulting spot shapes S on the surface of the workpiece W to be machined are illustrated therebelow. By means of various spot shapes S, the heat input or the weld pool, respectively, as well as the cooling rate can be optimally adapted for various machining tasks. For example, a higher gap bridgeability can be attained by means of a wider spot shape S (sixth image from the left with an angle) $\Delta\beta = 150°$. In the case of the angular position $\Delta\beta = 180°$, a spot shape S results, which is offset, at best, about the zero point N or the optical axis c, respectively, but which is unchanged.

Figure 7A:
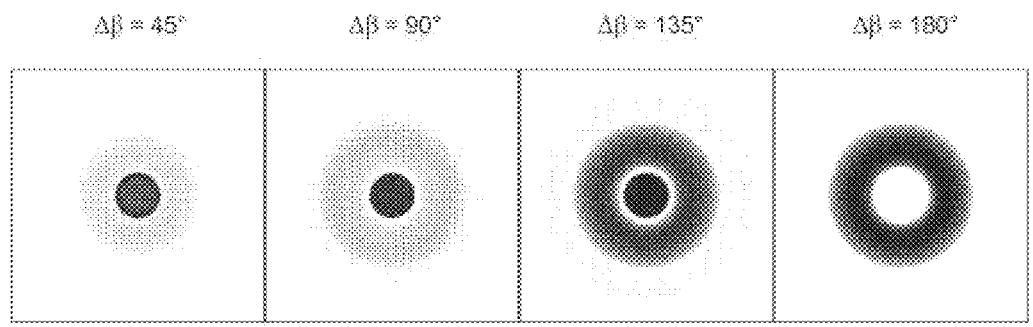
FIG. 7A shows various spot shapes in response to additional rotation.

FIG. 7A shows various spot shapes S in response to additional rotation of the optical wedges 5, 6 with the same speed in the same direction about the zero point N or the optical axis c, respectively. The angle $\Delta\beta$ between the optical wedges 5, 6 is maintained thereby. Spot shapes S, which may be ring-shaped (image on the far right according to FIG. 7A with an angle $\Delta\beta = 180°$), can be attained thereby. Rotational movements with continuously changeable angular position $\Delta\beta$ can likewise be realized.

Figure 7B:
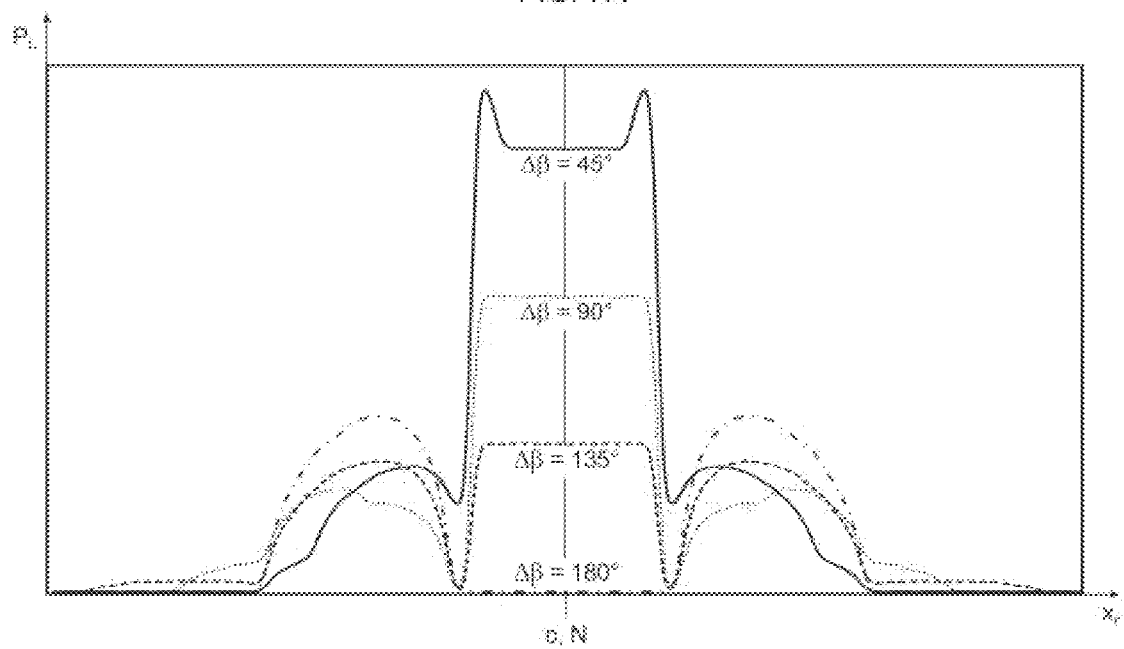
FIG. 7B shows the corresponding power densities of the spot shapes according to FIG. 7A.

The power density $P_L$ of the laser beam L is illustrated in FIG. 7B as a function of the radial position $x_r$ at the different angular positions $\Delta\beta$ according to FIG. 7A. By means of the corresponding rotation of the spot shapes S, different energy inputs can be attained on the surface of the workpiece W to be machined. In the case of various positions or movements of the laser beam L with respect to the workpiece W, certain spot shapes S can be advantageous, which is why they can also be selected as a function of the position and movement. In the case of combined laser-hybrid applications, the spot shape S of the laser beam can also be selected as a function of parameters of the electric arc or of the process phases.

Figure 8:
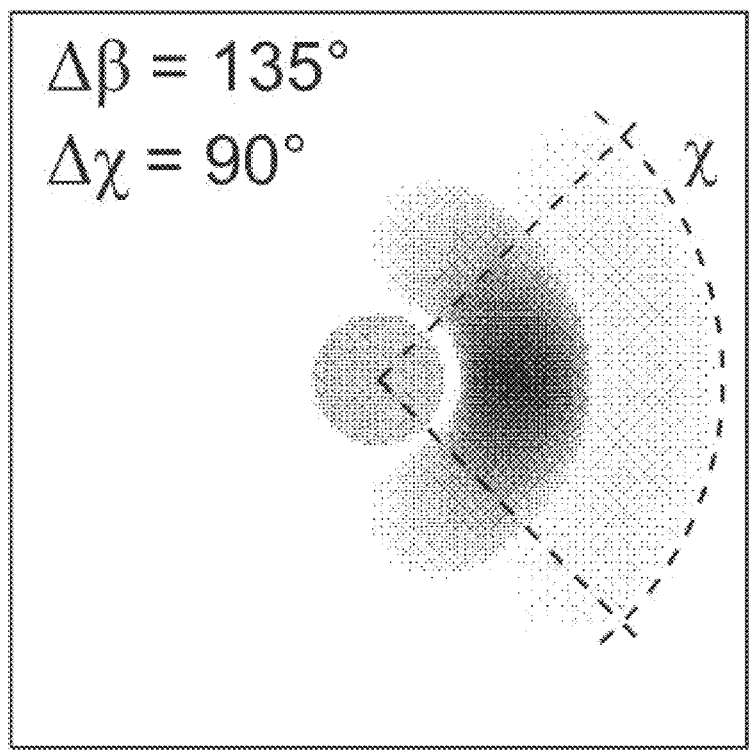
FIG. 8 shows the spot shape in response to a joint pendulum movement of the optical wedges.

Lastly, FIG. 8 shows the spot shape S in the case of a joint pendulum movement of the optical wedges 5, 6 about a specified angular range. In the illustrated exemplary embodiment, a constant angular position of the optical wedges 5, 6 to one another of $\Delta\beta = 135°$ is assumed, wherein the optical wedges 5, 6 are jointly moved back and forth about the specified angular range $\Delta\chi = 90°$. By means of such a pendulum movement, the specified angular range $\Delta\chi$ can be passed over about the optical axis c, and a corresponding heat distribution on the surface or in the workpiece W, respectively, can be attained. Pendulum movements with continuously changeable angular position $\Delta\beta$ can likewise be realized.

The present invention is characterized by a simple and adaptive formation of the laser beam L with small interference contour.

The invention claimed is:

1. A laser machining device for machining a workpiece using a collimated laser beam, the laser machining device comprising:

a laser generating device adapted to generate a laser beam;

a collimating lens adapted to collimate the laser beam to provide a collimated laser beam;

a focusing lens adapted to focus the collimated laser beam on the workpiece to be machined; and a beam-forming and deflecting optical system arranged between the collimating lens and the focusing lens, the beam-forming and deflecting optical system comprising:

a first optical element comprising a first optical wedge having a first wedge angle;

a second optical element comprising a second optical wedge having a second wedge angle, the second optical element disposed behind the first optical element in a direction of the collimated laser beam;

wherein at least one of the first optical element and the second optical element is connected to a drive adapted to rotate the at least one of the first optical element and the second optical element about an optical axis and to rotate at least one of the first optical wedge and the second optical wedge relative to the other of the first optical wedge and the second optical wedge; and wherein each of the first optical wedge and the second optical wedge cover only a part of the laser beam.

2. The laser machining device as claimed in claim 1 wherein the first wedge angle and the second wedge angle are quantitatively equal.

3. The laser machining device as claimed in claim 1, wherein each of the first optical wedge and the second optical wedge cover between 25% and 50% of the laser beam.

4. The laser machining device as claimed in claim 1, wherein the first optical wedge and the second optical wedge are formed in the shape of a sector of a circle or in the shape of a segment of a circle.

5. The laser machining device as claimed in claim 1 wherein the first optical wedge and the second optical wedge are each arranged in a respective hollow shaft.

6. The laser machining device as claimed in claim 5, further comprising at least one actual value sensor adapted to determine a position of at least one of the first optical wedge, the second optical wedge or the respective hollow shaft.

7. The laser machining device as claimed in claim 5, wherein each of the first optical wedge and the second optical wedge or the respective hollow shaft is connected to a respective drive adapted to independently rotate the respective first optical wedge and the second optical wedge about the optical axis.

8. The laser machining device as claimed in claim 5, further comprising a drive adapted to jointly rotate the first optical wedge and the second optical wedge or the respective hollow shaft.

9. The laser machining device as claimed in claim 1, wherein the first wedge angle and the second wedge angle are at least 1 millirad.

10. The laser machining device as claimed in claim 1, wherein the first optical wedge and the second optical wedge are made of quartz glass, borosilicate-crown glass, zinc selenide, or zinc sulfide.

11. The laser machining device as claimed in claim 1, wherein the drive is connected to a motor control.

12. A method for machining a workpiece using a collimated laser beam, the method comprising the steps of:
providing a collimating lens;
providing a focusing lens;
providing a beam-forming and deflecting optical system arranged between the collimating lens and the focusing lens, comprising at least two optical elements arranged one behind the other, wherein the at least two optical elements comprise at least two optical wedges, each having a respective wedge angle;
rotating at least one of the at least two optical wedges about an optical axis relative to another of the at least two optical wedges;
providing a laser beam to pass through the collimating lens to form the collimated laser beam;
running the collimated laser beam through the beam-forming and deflecting optical system; and
irradiating a surface of the workpiece by running the collimated laser beam through the focusing lens;
wherein the at least two optical wedges only partially cover the laser beam.

13. The method as claimed in claim 12, wherein the laser beam runs through the at least two optical wedges and the respective wedge angle of the at least two optical wedges is quantitatively equal.

14. The method as claimed in claim 12, further comprising the step of rotating the at least two optical wedges at a rotational speed of between 100 and 10000 U/min.

15. The method as claimed in claim 12, further comprising the step of detecting a position and rotation of the at least two optical wedges using at least one actual value sensor.

* * * * *